Patented Apr. 3, 1928.

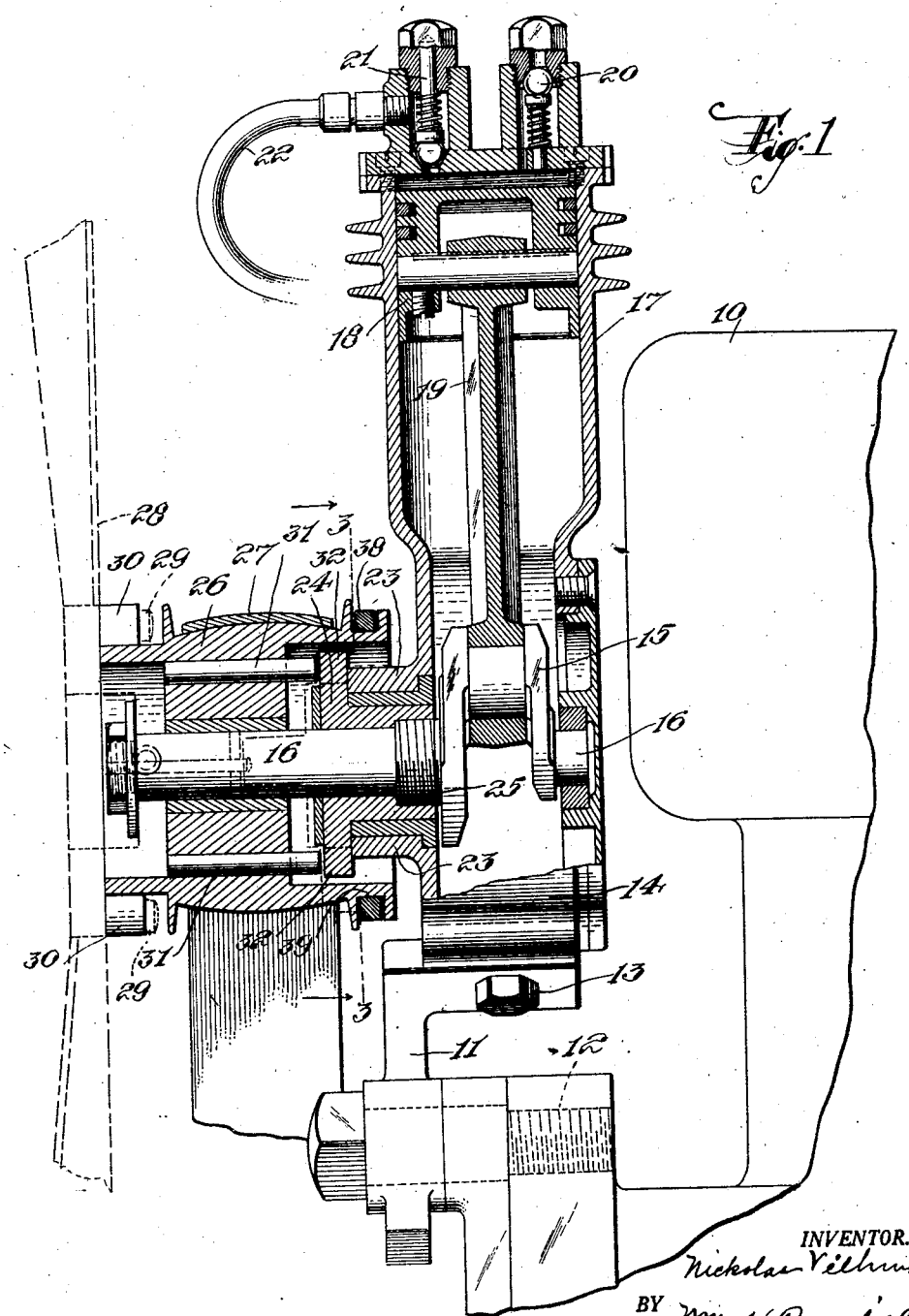

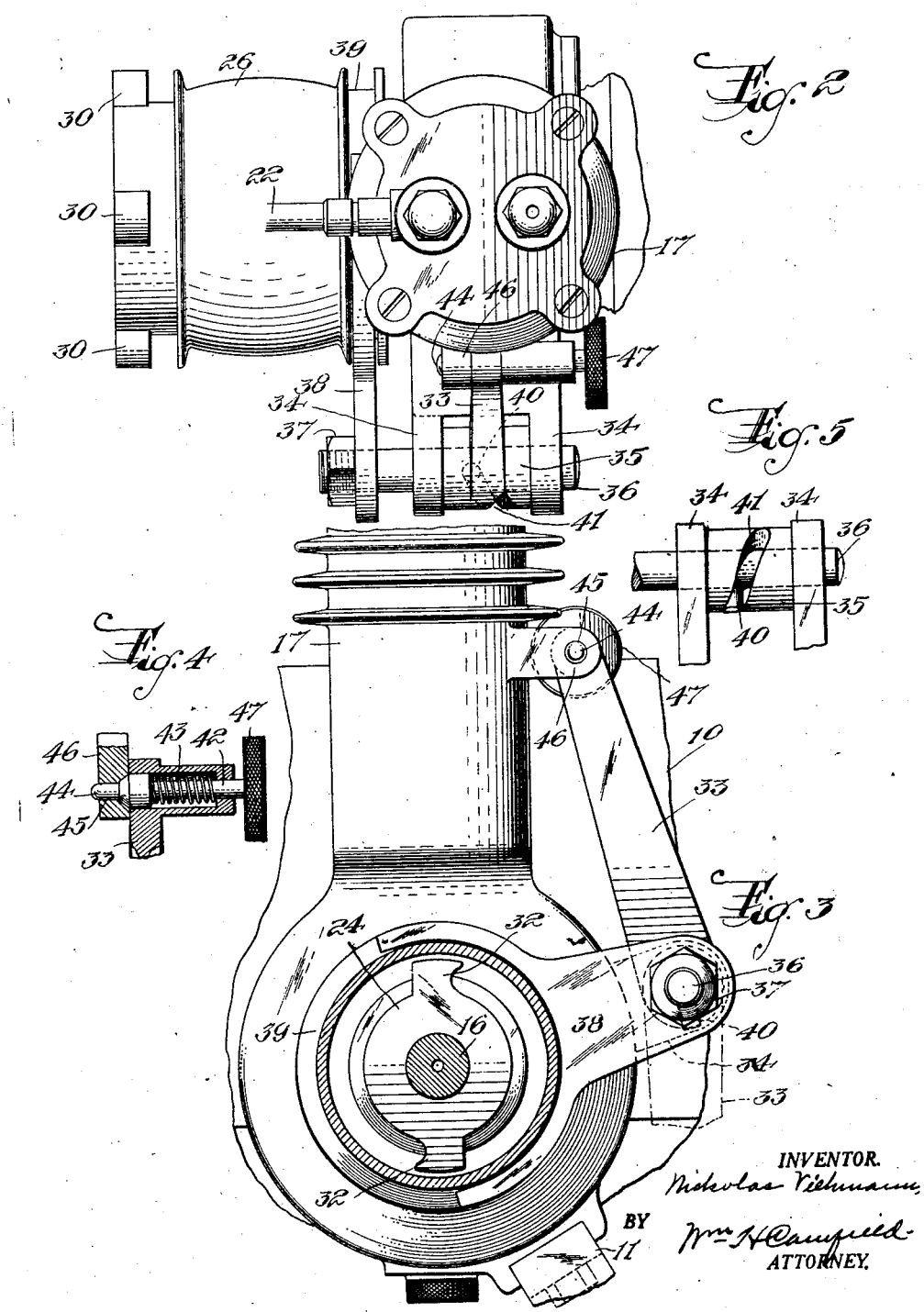

1,664,439

UNITED STATES PATENT OFFICE.

NICKOLAS VIEHMANN, OF NEWARK, NEW JERSEY.

CLUTCH.

Application filed January 27, 1925. Serial No. 5,115.

This invention relates to a compact and easily operated clutch device, which, in view of its compact construction requires but little space thus making it particularly adaptable for pumps mounted on the front of automobile engines and driven from the fan pulley.

The invention is further designed to provide a device of this kind in which the shifting of the clutch is brought about by the manual operation of a handle which swings perpendicularly to the shaft of the pump, that is, in a plane parallel to the plane of rotation of the fan so that it is not necessary to stop the engine or the fan for swinging the clutch as the hand of the operator is not brought close to the revolving fan and in case of such contact it would be moving in a direction parallel therewith and the chance of injury would be slight.

The invention relates to further details of construction which will be hereinafter more fully described and finally embodied in the claims. The invention is an improvement on the construction shown in U. S. Patent #1,503,002, issued July 29, 1924.

The invention is illustrated in the accompanying drawings in which Figure 1 is a section of my improved pump showing the attaching means in elevation. Figure 2 is a top view of the pump shown in Figure 1. Figure 3 is a section taken on line 3—3 in Figure 1. Figure 4 is a detail view showing a means of holding the handle in inoperative position and Figure 5 is a bottom view of the means for shifting the fan pulley.

In the drawing, 10 indicates the automobile engine and I show the usual bracket 11 fastened by a bolt 12 to the base of the cylinder or engine secured by a bolt 13 to the casing 14 of the pump. This pump casing embodies in the lower part, a chamber in which the crank 15 of the shaft 16 revolves and also embraces the cylindrical portion 17 in which the piston 18 and the connected rod 19 are placed and the usual check valves as the inlet valve 20 and the outlet valve 21, are mounted on the top of the cylinder. A flexible pipe 22 is used for conducting the air to a tire or other place where it is to be used. The shaft 16 extends through the bearing 23 of the pump casing and it has secured thereto the member 24 which is that part of the clutch which is fixed against longitudinal movement and which is fastened directly to the shaft 16 by a suitable means such as the screw thread 25.

Beyond the clutch member 24 I arrange the fan pulley 26 which is driven by the belt 27 and which carries the fan blades 28, the fan blades being usually fastened by screws 29 securing the fan to the lugs 30 on the fan pulley. The fan pulley is slidable on the shaft 16 and does not rotate therewith unless it is in operative connection with the clutch member 24. The fan pulley is therefore the sliding member of the clutch and I show the pins 31 which, when the pulley is thrust outwardly move out of contact with the fixed clutch member 24 and when the fan pulley is slid in, engage the projections 32 on the member 24. When this is done the parts, of course, are connected together so that the member 24, being turned, revolves the shaft 16 and of course, the crank and the piston then operate to compress air in the cylinder and force it to any point where it is to be used.

To make it safe for use even when the fan is revolving, I install a means for shifting the pulley which comprises a handle 33 which swings parallel with the plane of rotation of the fan blades 28, being mounted in bearings 34, the handle having a hub 35 between the bearings, and the bearings and the hub receive a rod 36 which is slidable in the bearings and hub and which extends toward the fan and is secured as by a nut 37 to the yoke 38 which fits loosely in the groove 39 in the fan pulley.

To slide the rod when the handle is swung, I place a pin 40 on the rod 36 which pin projects into a cam slot 41 in the hub. It will thus be evident that when the handle 33 is swung downwardly, the cam slot 41 pushes the pin 40 over and the rod 36 and the yoke 38 pull the fan pulley over at the same time and the clutch members are thus connected. A reverse movement disconnects the clutch and the hub is thus made inoperative.

To prevent accidental movement of the handle and to keep it in its raised position, I arrange at the end thereof, a small latch 42 sliding in a small housing 43 at the end of the lever or handle 33, the latch 42 having its end 44 arranged to fit in a hole 45 in the lug 46. The latch 42 is manually operable by means of the finger piece 47.

It will thus be evident that the handle at all times is safe for use because the hands are not operated in the direction of the fan, and, furthermore, the parts are disposed so that a small space is consumed by the clutch, the clutch being inside the fan pulley and the pulley is only moved a short distance which does not materially disturb the alignment of the belt. The device is made small enough so that it can be used in cars having but a small space such as a Ford car.

I claim:

1. In a device of the kind described, a casing, a shaft rotatable in the casing and extending therefrom, a fan pulley freely rotatable and slidable longitudinally on the shaft the fan pulley forming one member of a clutch, a second member of the clutch being secured to the shaft, bearings on the casing, a handle adapted to swing between the bearings and having a hub with an inclined slot, a yoke engaging the pulley to slide it, a rod secured to the yoke and slidable in the hub and the bearings, and a pin on the rod and extending into the slot in the hub, and co-acting means on the handle and the casing for locking the handle in normal position.

2. In a device of the kind described, a casing, a shaft rotatable in the casing, a fan pulley slidable on the shaft and forming one member of a clutch, a second clutch member on the shaft between the pulley and the casing, a rod secured to the first mentioned clutch member to slide it, a sleeve having a cam slot inclined upwardly toward the clutch, a pin on the rod and in the slot, a handle on the sleeve and mounted to swing in a plane perpendicular to the axis of the shaft, and means for locking the handle in its uppermost position, the weight of the handle acting to hold the clutch in when the handle is down.

In testimony that I claim the foregoing, I have hereto set my hand, this 18th day of November, 1924.

NICKOLAS VIEHMANN.